Oct. 25, 1955   C. G. PULLIN ET AL   2,721,615
SUSTAINING ROTORS FOR AIRCRAFT
Filed Aug. 25, 1947   2 Sheets-Sheet 1

INVENTORS
Cyril George Pullin
Jacob Samuel Shapiro
BY
ATTORNEYS

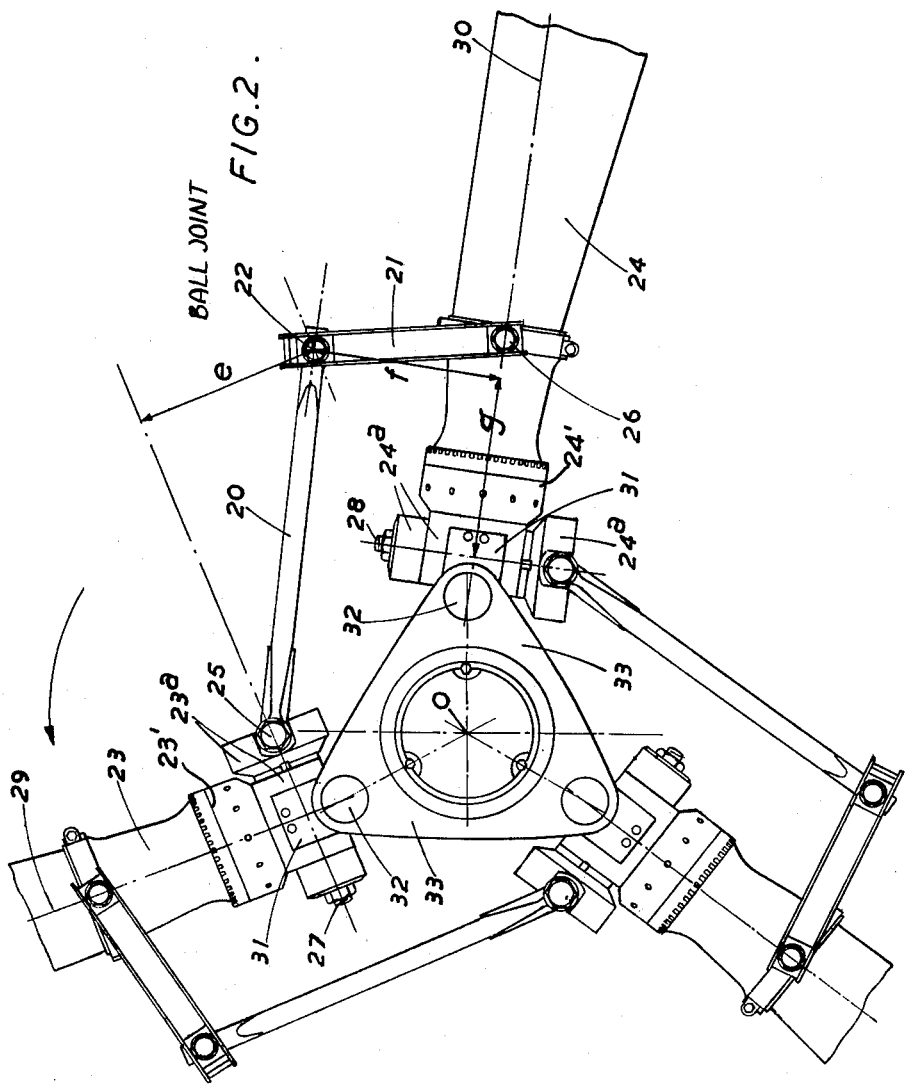

2,721,615

SUSTAINING ROTORS FOR AIRCRAFT

Cyril George Pullin, Tadburn, Ampfield, and Jacob Samuel Shapiro, Hampstead, London, England, assignors, by mesne assignments, to Autogiro Company of America, Philadelphia, Pa., a corporation of Delaware Application August 25, 1947, Serial No. 770,394
In Great Britain August 21, 1946

Section 1, Public Law 690, August 8, 1946
Patent expires August 21, 1966

2 Claims. (Cl. 170—160.13)

This invention relates to aircraft with rotary-wings, such as helicopters and rotaplanes, and intermediate types of aircraft, such as types in which the sustaining rotor or rotors is/are normally autorotative, but can have power applied to its/them for operation as a helicopter for special maneuvres, such as vertical take-off and landing, or in which autorotation of the rotor(s) is continuously assisted by application of power insufficient for hovering or vertical ascent but sufficient at least to overcome the profile drag of the rotor blades.

More particularly, the invention relates to sustaining rotors for such aircraft having flapping blades.

In translational flight the dissymmetry of the airflow over the advancing and retreating rotor blades would give rise to a rolling moment were it not for the introduction of flapping hinges, the result of which is that the blades execute a stable flapping oscillating which, speaking somewhat loosely, automatically equalizes the actual angles of attack of the advancing and retreating blades and eliminates the rolling moment.

The detrimental effects of excessive flapping, which occurs at high translational speeds, i.e. high values of the "tip speed ratio," represented in the notation as $V/R\Omega$, are well known. For one thing, as a result of the flapping the blades run out of track with the plane perpendicular to the mechanical axis of the rotor, and this introduces variations of angular velocity in the mean tracking plane. If the blades run out of track, freedom of the blades about drag hinges, while eliminating reversed bending of the blades, introduces drag oscillations whose effect is equivalent to unbalancing of the rotor so that vibrations are transmitted to the airframe and controls. In an aircraft with a free-flapping rotor with "pure" flapping hinges, these vibrations may become prohibitively serious.

It is therefore highly desirable to reduce the amplitude of flapping as much as possible. Another way of expressing this is to say that the ideal to be aimed at is a "flat-tracking" rotor, the mean plane of whose track is perpendicular to the mechanical axis.

This can be achieved by applying cyclic pitch control to impress a variation of blade pitch angle of the "first-order" or fundamental frequency, i. e. once per revolution, such that the dissymmetry of airflow over the advancing and retreating blades (averaged along the span) is compensated without flapping, and the means plane of the track becomes perpendicular to the mechanical axis. This, however, depends on manipulation of the control and is not automatic.

Much thought has been expended on the devising of automatic means for making a flapping rotor approach to the flat-tracking ideal. A satisfactory automatic flat-tracking rotor would permit of the use of "hub-tilting" for control, which besides its attraction from the aspect of mechanical simplicity possess the advantage of eliminating the large changes of fore and aft aircraft attitude with changes of forward speed which are usually associated with the cyclic pitch control system.

Most methods hitherto proposed involve automatic variation of the blade pitch angle in response to flapping. One of these is the so called "negative delta three" or torsional flapping hinge, whereby upward flapping is accompanied by decrease of pitch angle and conversely. To be of much use in reducing flapping amplitude, the ratio, pitch angle change/flappinging angle, must be large, in fact greater than unity at least, since a cyclic pitch angle oscillation of a given amplitude is equivalent to a flapping oscillation of the same amplitude. But when hub-tilting control is used, the immediate control response is out of phase (in azimuth) with the control displacement. This system is therefore unacceptable in its simple form.

Another proposal was to interconnect adjacent blades mechanically so that the pitch angle of any blade is decreased by upward flapping of the preceding blade, the relationship being approximately linear as in the "delta three" system. This system is also unacceptable, since except in special cases the control response will again be out of phase with the control movement.

The possibility of combining these two systems has been suggested, but, so far as it is known to us, has not been studied in detail, nor have the underlying principles been formulated.

Our researches have been directed to defining the fundamental requirements for a satisfactory flat-tracking rotor, i. e. one in which the amplitude of "residual" flapping is small compared with the flapping amplitude of a rotor with pure-flapping hinges (without cyclic pitch control) at any given value of $V/R\Omega$.

The main requirements that we find must be satisfied are that the maximum-minimum phase of the residual flapping must, in steady light, be, at least approximately, in the vertical plane containing the direction of translational movement of the rotor; and, which is more important, when a steady rate of tilt is applied to the rotor hub, the maximum-minimum phase of residual flapping must be in a vertical plane perpendicular to the axis of tilt, or approximately so. When the latter requirement is met the tilting control will be correctly phased.

We have also found that the second of these requirements is satisfied if a cyclic pitch angle variation (of first order frequency) is automatically impressed, whose amplitude is proportional to the amplitude of flapping and whose phase is displaced from the phase of flapping by an angle $\alpha$, whose value depends on the ratio $d_1$ of the amplitude of cyclic pitch variation and flapping, and on a combined inertia and aerodynamic parameter of the system, which is the ratio of the moment of inertia, J, of the blade about the flapping hinge to a quantity, K, which may be termed "aerodynamic inertia," being the integral over the span of $\frac{1}{2}\rho a r^3 c dr$, where $\rho$ is the air density, $a$ is the slope of the lift curve (plotted against angle of incidence), and $r$ the distance from the rotor axis of a chordwise blade-strip of area $cdr$.

Adopting the convention that $\alpha$ is defined as the angle by which the phase of minimum pitch angle is displaced in the direction of rotation from the phase of maximum upward flapping, the relation defining $\alpha$ in terms of $d_1$ and $J/K$ is, $$\tan \alpha + \frac{1}{d_1} \sec \alpha = 2J/K \qquad (i)$$

We have also found that this value of $\alpha$ (in terms of $d_1$ and $J/K$) meets the first of the above-mentioned requirements relating to the phasing of residual flapping in steady forward flight to a good degree of approximation.

With values of $d_1$ and $J/K$ within the ranges that are attainable in practice, we find that all values of the angle $\alpha$ which satisfy the more important requirement, of correct control phasing, i. e. no phase-displacement of flapping with respect to plane of rotor tilt, lie between 30° and 75°.

It may be mentioned that the quantity of $d_1$ is a measure of the ratio in which flapping amplitude is reduced by the automatic imposition of cyclic pitch angle variation, i. e. of the degree of flat-tracking achieved. The ratio of the flapping amplitude of a pure-flapping rotor to the residual flapping amplitude of the modified rotor at the same $V/R\Omega$ can be shown to be equal to $$\sqrt{d_1^2 + 1 + 2d_1 \sin \alpha}$$

which lies between $(d_1+1)$ and $$\sqrt{d_1^2+1}$$

for all values of $\alpha$ between 0 and $$\frac{\pi}{2}$$

In view of what has been said above, the reasons why the negative delta three system and the system, which may be called "pure back-coupled," wherein the pitch angle variation depends solely on the flapping of the preceding blade, are unsatisfactory will now be evident. For, in the negative delta three system $\alpha$ is zero and Equation (i) therefore reduces to $$\frac{1}{d_1} = 2\frac{J}{K}$$

and as $2J/K$ is always greater than unity the system can only meet the requirements hereinbefore stated, if $d_1$ is less than unity, and this gives no useful reduction of flapping amplitude, i. e. no useful approach to flat-tracking is obtained.

In the "pure back-coupled" system $$\alpha = \frac{2\pi}{N}$$

and Equation (i) reduces to $$\frac{1}{d_1 \cos 2\frac{\pi}{N}} + \tan 2\frac{\pi}{N} = 2\frac{J}{K}$$

For practical values of $2J/K$ this can only be satisfied when $N>6$; and if $N=6$ and $2J/K$ lies, as is usual, between 2 and 3, the required value of $d_1$ will be between 7.4, for $2J/K=2$ and 1.575, for $2J/K=3$. The "pure back-coupled" system is therefore only applicable to a rotor with six or more blades, and then only if the amplification ratio of pitch angle variation to flapping has a specified value.

The invention in its broader sense therefore consists in incorporating in an aircraft sustaining rotor with generally upright axis and having radially disposed flapping blades capable of blade pitch-angle variation, mechanism for rendering the pitch angles and flapping angles of the blades interdependent, in such a way that a flapping oscillation of frequency once per revolution is accompanied by an oscillation of pitch angle of the same frequency and of proportional amplitude, but with a phase displacement such that the azimuth of minimum pitch angle is displaced from that of maximum upward flapping in the direction of rotation by angle between 15° and 75°, and preferably satisfying, at least approximately, the above stated Relation i.

The invention also includes specific mechanism, which, with appropriate dimensioning of their several parts will achieve the required interdependence of pitch angle and flapping angles.

In one such mechanism according to the invention, the rotor blades are mounted for independent pure-flapping and pitch angle variation and are connected by identically similar linkages to a swash-plate supported on a gimbal-mounting which is centred on the rotor axis and free to slide axially on the rotor hub; and each linkage consists of a link lying in a plane containing the rotor axis and the spanwise axis of the blade, and so attached that blade pitch angle variations do not affect the swash-plate, and another link connecting a pitch angle varying lever, extending from the blade in the direction contrary to that of the rotation of the rotor, and so attached to the blade that its position is unaffected by flapping, to a point of the swash-plate situated in axial plane of the latter and displaced angularly by not more than 90° from the axial plane containing the first link in the direction contrary to that of the rotation of the rotor.

The first mentioned linkage tilts the swash-plate about the same axis and in the same direction as the axis and direction of tilt of the blade tracking plane, while the second-mentioned linkage impresses a cyclic pitch angle variation whose phase of minimum pitch-angle is displaced in the direction of rotation from the phase of maximum upward flapping by an angle $\alpha$ which is equal to the angular displacement, in the direction contrary to the direction of rotation, of the swash-plate attachments of the second linkage with respect to those of the first linkage. The amplitude ratio of pitch angle oscillation and flapping is determined by the radii of the two sets of link attachments on the swash-plate, the radius of the blade attachments of the first linkage, the length of the pitch changing levers, the flapping pivot offset, and the phase displacement angle $\alpha$. The sliding mounting of the swash-plate's supporting gimbal allows the blades to cone, and it will be seen that coning is accompanied by decrease of pitch angle; and it can be shown that the ratio, pitch angle decrease/coning angle, exceeds by the factor sec $\alpha$ the ratio, cyclic pitch angle amplitude/flapping amplitude, previously identified by the symbol $d_1$.

In rotors of more than three blades this mechanism introduces a constraint, which suppresses those modes of flapping (of higher frequency than once per revolution) in which the blade-tips do not remain coplanar, and thereby introduces bending moments at the roots of the blades, which may be serious in some flight conditions. Geometrical limitations, which make it difficult to achieve values greater than unity for the ratio $d_1$, whereas the practically useful values lie between 2 and 3, also restrict the usefulness of this mechanism.

In another mechanism in accordance with the invention, applicable to three- or more-bladed rotors, the blades are mounted for independent flapping and pitch variation, and are each connected to the adjacent blade by a linkage, which may be called a "back-coupling" linkage, and which determines the pitch angle of a blade in terms of the flapping angles of itself and of the preceding blade (with reference to the direction of rotation) so that the pitch angle of a blade is decreased by its own upward flapping and by that of the preceding blade; or, considering the matter in another way, upward flapping of a blade decreases both its own pitch angle and that of the following blade. The ratio of pitch-angle change to flapping for each of these two effects, which are additive for any one blade, is determined by the geometry of the back-coupling linkage.

Specific examples of the swash-plate and "back-coupling" types of mechanism for carrying out this invention are illustrated in the accompanying drawings of which:

Fig. 2 is a plan view of a three-bladed rotor hub assembly incorporating the back-coupling type of mechanism.

Figure 1:
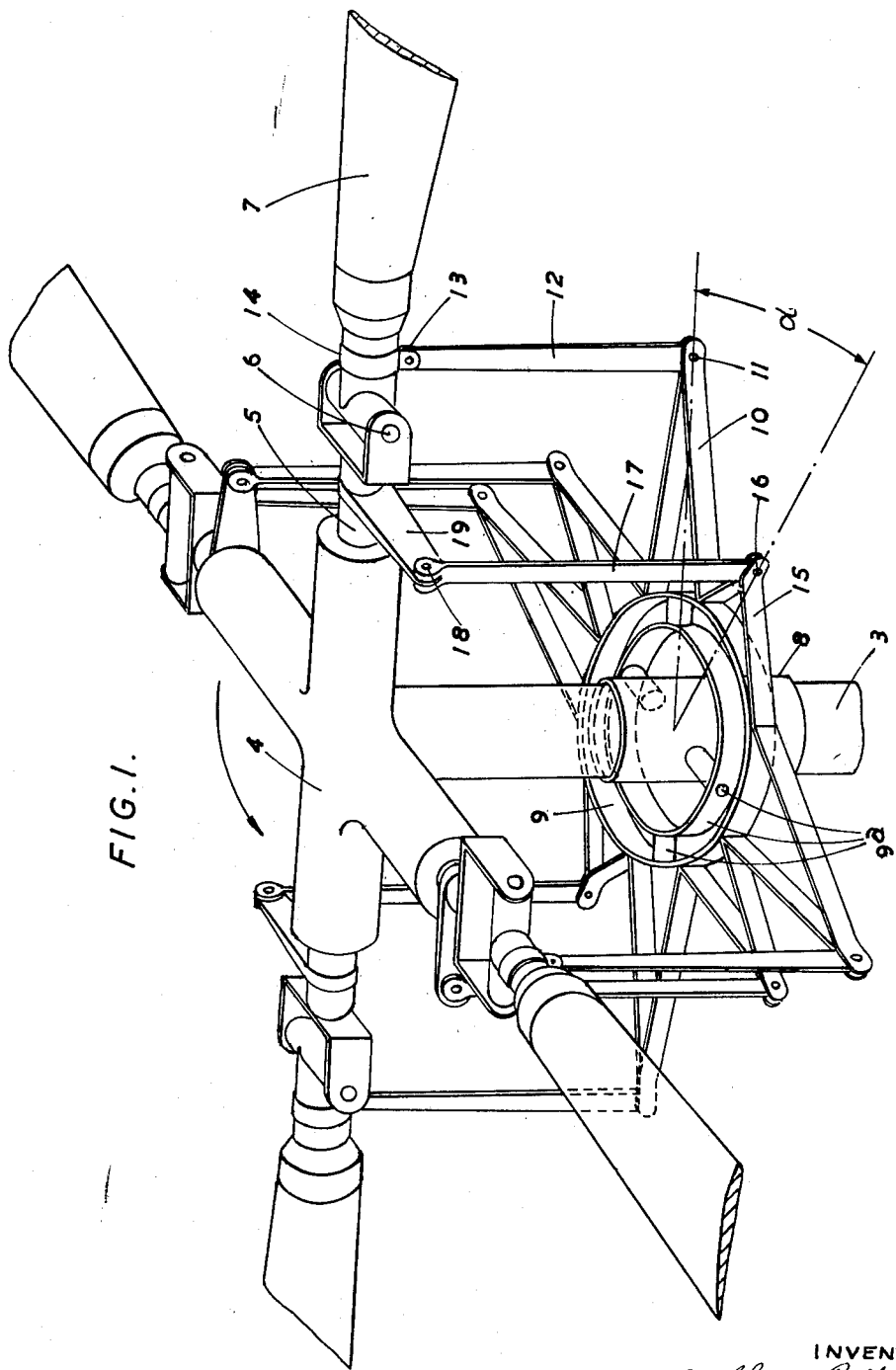
Fig. 1 is a schematic perspective view of a four-bladed rotor hub assembly incorporating the swash-plate type of mechanism.

The assembly of Fig. 1 comprises a hub shaft 3 rigidly connected to a cruciform hub member 4 whose radial arms are provided with bearings (not shown) in which forked blade stubs 5 are mounted for rotation about the axes of the radial arms. The forked blade stubs 5 carry flapping pivots 6 on which the blades 7 are flappingly mounted. A sleeve 8 which slides freely on the shaft 3 and is prevented from rotating with respect to it by means (not shown) such as a key or splines, supports a swash-plate 9 by means of a gimbal mounting 9ª. The term swash-plate is used herein as a convenient descriptive term for any suitable universally-rockable member or assembly adapted to function essentially as hereinafter set forth. The swash-plate has radial arms 10 which lie in the same radial planes of the rotor as the several blades 7 and each arm 10 is connected by an upwardly extending link 12 to a sleeve 14 embracing the shank of the corresponding blade 7. The links 12 are pin jointed at each end, 11, 13 and the sleeve 14 can rotate on the blade shank (about the spanwise or radial axis of the blade) but is prevented from sliding along the blade shank by suitable abutments (which do not appear in the drawings). The swash-plate 9 is also provided with a second set of radial arms 15 which are likewise severally connected by upwardly extending links 17 with levers 19 which are rigidly mounted on the several blade stubs 5 from which they extend substantially in the plane of rotation in the direction contrary to that of rotation which is indicated by an arrow. The links 17 are pin jointed at 16, 18 to the arms 15 and levers 19 respectively and the latter are of such length that the links 17 are substantially parallel to the axis of shaft 3. Each arm 15 is angularly displaced in azimuth from the corresponding arm 10 by the angle $\alpha$.

In this mechanism it will be seen that (1) coning of the blades and those modes of flapping which are in effect periodic variations of the coning angle are accommodated by axial sliding of the sleeve 8 and the swash-plate 9 on the shaft 3; (2) that axial displacements of the swash-plate give rise to variations of blade pitch angle such that upward coning decreases the blade pitch angle and the variation of pitch angle, in so far as it is periodic, being in phase with the flapping oscillation of coning type; (3) that all modes of flapping (in particular the first-order flapping of frequency once per revolution) in which the blade tips remain coplanar and their plane passes through a fixed point of the axis of shaft 3, give rise to a tilting of the swash-plate on its gimbal mounting in phase with the flapping oscillation, the angle through which the swash-plate is tilted being proportional to the amplitude of the flapping oscillation; (4) that this tilting of the swash-plate gives rise to an oscillatory variation of blade pitch angle of the same frequency as the exciting flapping oscillation but displaced therefrom in phase so that the azimuth of minimum blade pitch angle is displaced from the azimuth of maximum upward flapping in the direction of rotation by the angle $\alpha$, the amplitude of the pitch-angle oscillation being proportional to the amplitude of the flapping oscillation; (5) that the amplitude of the pitch angle oscillation due to flapping of the type mentioned in (3) above is equal to $\cos \alpha$ times the change of pitch angle due to a change of coning angle equal to the half-amplitude of flapping, or that the ratio of the amplitude of pitch angle oscillation due to flapping of the types respectively mentioned in (3) and (1) above is $\cos \alpha$; (6) that other modes of flapping than those mentioned in (1) and and (3) above are suppressed; in the example illustrated in which there are four blades flapping of frequency twice per revolution is thus suppressed.

In the example illustrated the links 12 and 17 are both parallel to the axis of the shaft 3. This is not essential. The links 12 must however lie in the plane containing the axis of shaft 3, and the arms 15 must be displaced from the arms 10 by the angle $\alpha$. The links 17 may be inclined to the plane containing the axis of shaft 3 but should not deviate from such a plane by more than a small angle.

A preferred form of "black-coupling" linkage as applied to a three-bladed rotor is illustrated in Fig. 2. In this arrangement the rotor hub 33, whose axis is indicated at O carries drag pivots 32 and on which are articulated drag links 31, to which blade stubs 23ª, 24ª are articulated on flapping pivots 27, 28 respectively.

Blades 23, 24 are mounted on the blade stubs 23ª, 24ª, respectively by means of pitch varying pivots (enclosed within the housings 23', 24') whose axes coincide with the spanwise axes 29, 30 of blades 23, 24 respectively. Of the pair of blades 23, 24, blade 23 is the leading blade.

The "back-coupling" linkage comprises a pair of links 20, 21 connected to each other by a ball joint 22. Link 20 is connected to the leading blade stub 23ª on a pivot 25 whose axis intersects that of the flapping pivot 27 at right angles and is substantially parallel to the axis of the drag pivot 32. Link 21 is connected to the following blade 24 itself, at a point outboard of the flapping pivot 28, by means of a pivot 26 whose axis is substantially parallel to the axis of rotation, being parallel to the axis of the drag pivot 32, when the following blade 24 has its basic pitch angle and the flapping angles of the leading and following blades are both zero; and when the blades are in this position the inter-link joint 22 lies in the plane containing the spanwise axes 29, 30 of the blades.

The lengths of the links are such that the leading link 20 makes an obtuse angle with the span-wise axis 29 of the leading blade 23, so that the inter-link joint 22 falls when the leading blade rises in flapping and conversely.

The determining dimensions of this linkage are the lengths $e$, $g$, and $f$ of the perpendiculars from the inter-link joint 22 on the axes of the flapping pivots 27, 28 of the leading and following blades respectively and on the pitch-change axis 29 of the following blade.

The lengths of these perpendiculars are slightly altered by flapping, pitch-change and unsymmetrical displacements of the blades on their drag pivots, but unless any or all of such displacements are larger than is usual the percentage changes of the lengths $e$ and $g$ will be reasonably small and that of length $f$ will be negligible, provided the following link is nearly perpendicular to the pitch-changing axis of the following blade.

If the structure were modified by placing the drag pivots outboard of the flapping pivots, the pivot 25 would be omitted, the link 20 being rigidly connected to the drag link, and the axis of pivot 26 would always be in a plane parallel to the drag pivot of the following blade.

If at any instant the flapping angles of any two adjacent blades are $\beta_L$ for the leading blade and $\beta_F$ for the following blade, the departure, $\theta$, of the pitch angle of the following blade of the pair from the mean value will be given by $$-\theta = p\beta_F + q\beta_L \qquad \text{(ii)}$$

where $p$ and $q$ are the ratios of pitch change of the following blade to flapping of the following and leading blades respectively and are specified in terms of the quantities $e$, $f$ and $g$ by the relations $$p = \frac{g}{f} \quad \text{and} \quad q = \frac{e}{f}$$

If $\beta_F$, $\beta_L$ are expanded in terms of $\psi$, $2\psi$, ... $n\psi$, where $\psi$ is the azimuth angle of the following blade, Equation ii becomes, $$-\theta = \beta_0(p+q) + \sum_{1}^{\infty} n\beta_n \left[ p \cos n(\psi + \psi_n) + q \cos n\left(\psi + \psi_n + \frac{2\pi}{N}\right) \right] \qquad \text{(iii)}$$

where $N$ is the number of blades, $\beta_0$ is the coning angle and $\beta_n$, $\psi_n$ are the amplitude and phase of flapping of frequency $n$ times per revolution.

If the datum of $\psi$ is chosen so that $\psi_1 = 0$, (iii) reduces to $$-\theta = \beta_0(p+q) + \beta_1\left[ p \cos \psi + q \cos \left(\psi + \frac{2\pi}{N}\right) \right] + \sum_{n=2}^{n=\infty} n\beta_n \left[ p \cos n(\psi + \psi_n) + q \cos n\left(\psi + \psi_n + \frac{2\pi}{N}\right) \right] \qquad \text{(iv)}$$

which can be replaced by $$-\theta = d_0\beta_0 + d_1\beta_1 \cos(\psi+\alpha_1) + \sum_{n=2}^{n=\infty} d_n\beta_n \cos n(\psi+\psi_n+\alpha_n) \quad \text{(v)}$$

where $$\begin{cases} d_0 = p+x \\ d_1 = \sqrt{\left(p+q\cos\frac{2\pi}{N}\right)^2 + q^2\sin^2\frac{2\pi}{N}} \\ \phantom{d_1} = (p+q\cos 2\pi/N)\sec\alpha_1 \\ \tan\alpha_1 = \dfrac{q\sin\frac{2\pi}{N}}{p+q\cos\frac{2\pi}{N}} \\ d_n = \sqrt{\left(p+q\cos n\frac{2\pi}{N}\right)^2 + q^2\sin^2 n\frac{2\pi}{N}} \\ \tan\alpha_n = \dfrac{q\sin n\frac{2\pi}{N}}{p+q\cos n\frac{2\pi}{N}} \end{cases} \quad \text{(vi)}$$

It will be seen that, when $n$ is an integral multiple of $N$, $$d_n = d_0 = p+q \text{ and } \alpha_n = 0$$

The physical interpretation of this is that the flapping motion at these frequencies is an oscillatory coning.

Equation iv is derived directly from the kinematics of the back-coupled system illustrated in Fig. 2, and the corresponding equation derived from the kinematics of the swash-plate system takes the form of Equation v, with the further conditions imposed by the inherent constraint, previously mentioned, that for values of $n$ which are not integral multiples of N, and for which the blade tips do not remain co-planar, $d_n=0$, and that for other values of $n$ which are not integral multiples of N, $d_n$ and $\alpha_n$ have the values $d_1$, $\alpha_1$, and, for values of $n$ which are integral multiples of N, $$d_n = d_0 = d_1 \sec\alpha_1 \text{ and } \alpha_n = 0$$

so that for the swash-plate mechanism the coefficients of Equation v are given by $d_1 = d_0 \cos\alpha_1$
$d_n = d_0$ when $n$ is an integral multiple of N
$\alpha_n = 0$ when $n$ is an integral multiple of N
$d_n = 0$ when $n$ is such that the blade tips do not remain co-planar  (vii)
$d_n = d_1$ for all other values of $n$
$\alpha_n = \alpha_1$ for all other values of $n$ The swash-plate and back-coupling systems are therefore equivalent as regards dependence of pitch-angle on flapping of the first-order or fundamental frequency.

We claim:

1. An aircraft sustaining rotor with generally upright axis comprising a hub and radially disposed blades, each connected to the hub by an articulation including a flapping pivot and a pitch change pivot, a pitch change linkage associated with each blade coupling such blade with the rotationally preceding blade, the interconnections between the linkages and the preceding blades being each made through a pivot joint located at a point offset from the axis of the flapping pivot of such preceding blade and coupled to said blade through an arm so as to be actuated by flapping of said blade about said pivot, and the interconnections between the linkages and the following blades being each made through a pivot joint located at a point offset from the axes of both the flapping and the pitch change pivots of such following blade and coupled to said blade through an arm so as to oscillate said blade about said pitch change pivot in accordance with flapping motion of the rotationally preceding blade, the linkages being so dimensioned and arranged that said oscillation of the following blades about their pitch change axes is an oscillatory motion whose amplitude is proportional to the amplitude of the once per revolution flapping oscillation of the blades and whose phase is such that the azimuth of minimum pitch angle is displaced from the azimuth of maximum upward blade flapping in the direction of rotation by an angle between 30° and 75°; the articulation for each blade comprising a blade stub connected to the hub by the flapping pivot, each blade being connected to its stub by the pitch change pivot; said linkage for each blade including a member connected to the blade stub and extending substantially in the plane of rotation at an obtuse angle from the spanwise axis of the blade measured in the direction contrary to that of the rotation of the rotor, said member being connected by a joint with three degrees of angular freedom to a second link, which extends from the following blade in the general direction of rotation and substantially in the plane of rotation and is pivotally connected to the following blade about an axis substantially parallel to the axis of rotation.

2. An aircraft sustaining rotor as claimed in claim 1, having drag pivots on which drag links are articulated to the rotor hub, the blade-stubs being articulated to the drag links on flapping pivots, and in which the links attached to the blade-stubs are connected thereto by pivots whose axes intersect the flapping pivot axes at right angles and are substantially parallel to the axes of the drag pivots.

References Cited in the file of this patent

UNITED STATES PATENTS

| Number | Name | Date |
|---|---|---|
| 1,800,470 | Oehmichen | Apr. 14, 1931 |
| 2,256,635 | Young | Sept. 23, 1941 |
| 2,356,692 | Platt | Aug. 22, 1944 |
| 2,397,154 | Platt | Mar. 26, 1946 |
| 2,408,489 | Stalker | Oct. 1, 1946 |
| 2,439,089 | Hodson | Apr. 6, 1948 |